Sept. 23, 1969     T. R. CASSEL     3,468,560
CONNECTION FOR TUBULAR MEMBERS
Filed Aug. 11, 1967
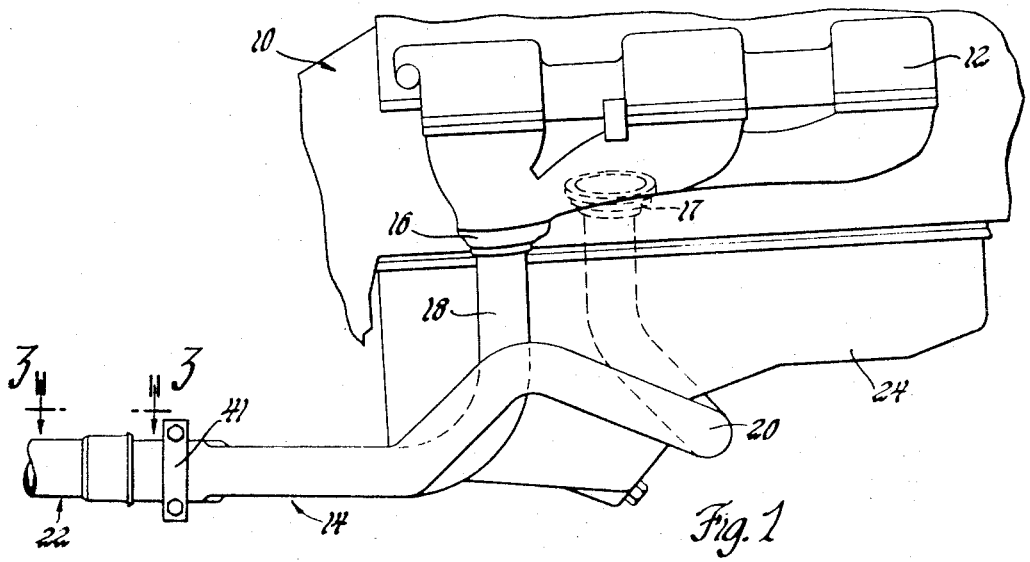
Fig. 1
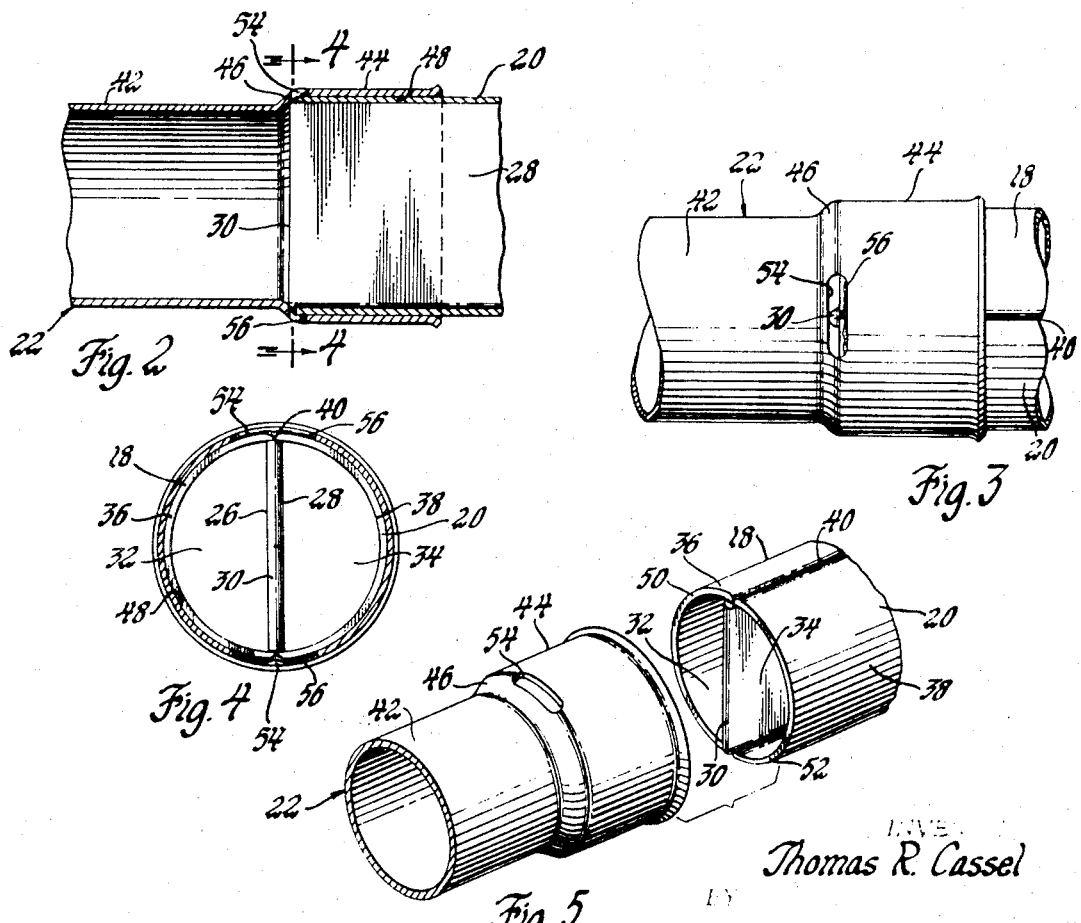
Thomas R. Cassel
E. J. Bishop
ATTORNEY United States Patent Office 3,468,560
Patented Sept. 23, 1969

3,468,560
CONNECTION FOR TUBULAR MEMBERS
Thomas R. Cassel, Birmingham, Mich., assignor to General Motors Corporation, Detroit, Mich., a corporation of Delaware
Filed Aug. 11, 1967, Ser. No. 659,929
Int. Cl. F16l 13/02, 39/00, 41/00
U.S. Cl. 285—21                          2 Claims

ABSTRACT OF THE DISCLOSURE

A conduit connection for a vehicle exhaust system having branch conduits arranged to form an outwardly facing annular surface that is telescopically received within a main conduit. A pair of circumferentially extending diametrically opposed slots are formed in the main conduit and each has a major axis aligned with the ends of the branch conduits and a minor axis aligned with the interfitting walls of the branch conduits. A weld material, applied within the slots, integrally connects the branch conduits to the main conduit and forms a gas-tight seal therebetween.

---

Recent automobile exhaust systems have connected the exhaust manifold branch conduits to a single outlet main conduit by shaping and interfitting the usually juxtaposed and individually D-shaped end portions of the branch conduits to form an outwardly facing annular surface that is telescopically received within the main conduit and secured thereto by a single clamping member. This advancement eliminated the need for the adapter flanges and the multiplicity of fasteners previously used in exhaust connections, however, it was found that an excessive tightening of the clamping member would buckle the interfitting walls of the branch conduits. Therefore, reinforcing plates were added at the interfitting walls to provide the necessary structural strength. Additionally, in order to achieve a gas-tight seal in these assemblies, separate sealing means must be interposed in the longitudinal gaps created between the main conduit and the branch conduits at the juncture of the curved side walls and the interfitting vertical side walls. Thus, the inherent simplicity of the telescoping branch conduit design is partially diminished by the presence of separate clamping, sealing, and strengthening components.

The present invention substitutes weldments for the reinforcing plates, the separate sealing means and the clamping means of the previous exhaust conduit assemblies. Circumferentially extending and diametrically opposed slots are formed in the main conduit and the branch conduits are positioned within the main conduit so that the major axis of the slots is transversely aligned with the end portions of the branch conduits while the minor axis is longitudinally aligned with the intersection of the interfitting walls. A weld is applied to the slots to integrally connect the branch conduits to the main conduit. Inasmuch as the compressive force of the clamping member is eliminated by welding, reinforcing plates are not needed for structural strength, and further, the weld material fills and seals the longitudinal gaps between the branch conduits thereby eliminating the need for separate sealing strips or gaskets.

Accordingly, the objects of the present invention are: to provide an improved connection between the branch conduits and the main conduit of a vehicle exhaust system; to provide a connection between the branch conduits and the main conduit of a vehicle exhaust system wherein the ends of the branch conduits are interfitted to form an annular assembly that is telescopically received within a complementary portion of the main conduit and are integrally and sealingly connected thereto by welds; and to provide a gas-tight and rigid connection for a vehicle exhaust system having interfitting D-shaped end portions that are telescopically received within an end portion of the main conduit and are secured thereto by welds formed in circumferentially extending diametrically opposed slots that have a major axis transversely aligned with the end portion of the branch conduits and a minor axis aligned with the longitudinal intersection of the interfitting portions.

These and other objects will be apparent to one skilled in the art upon reading the following detailed description, reference being made to the accompanying drawings in which:

FIGURE 1 is a side elevational view of an exhaust conduit system for an internal combustion engine provided with a conduit connection made in accordance with the present invention;

FIGURE 2 is an enlarged side cross-sectional view of the conduit connection shown in FIGURE 1;

FIGURE 3 is a top view taken along line 3—3 of FIGURE 1 showing the conduit connection prior to welding;

FIGURE 4 is a view taken along line 4—4 of FIGURE 2; and

FIGURE 5 is a perspective view of the main conduit and branch conduits shown in FIGURES 1 through 4.

Referring to FIGURE 1, a conventional internal combustion engine 10 having exhaust manifolds 12 on either side thereof is provided with a conduit system 14 connected to the exhaust manifold outlets 16 and 17 for the discharge of the engine's products of combustion. The exhaust system 14 comprises a pair of branch conduits 18 and 20 and a main conduit 22. Branch conduit 18 extends downwardly from manifold outlet 16 and curves rearwardly behind the engine 10 to the forward end of the main conduit 22. Branch conduit 20 extends downwardly from manifold outlet 17, passes beneath the engine oil pan 24 and then extends rearwardly behind the engine to the forward end of the main conduit 22.

While the branch conduits 18 and 20 may be of the form shown and described in the pending application of Thomas R. Cassel, Ser. No. 442,768 filed on Mar. 25, 1965, the preferred embodiment of this invention uses the branch conduit system shown and described in the pending application, Thomas R. Cassel et al., Ser. No. 493,781 filed on Oct. 7, 1965, and assigned to the assignee of the present invention. In the latter application, the branch conduits 18 and 20 are formed from a single conduit that has an intermittent portion shaped to a generally D-shaped cross section. As best shown in FIGURES 2 and 5, a pair of branch conduits are formed by the severing of the curved portion of the D-shaped section to the straight side wall and then reversely bending the conduit upon itself to form the branch conduits 18 and 20 having juxtaposed and interfitting side walls 26 and 28 integrally connected by a continuous reversely bent juncture wall 30. The resulting assembly provides dual exhaust outlets 32 and 34. The semi-circular side walls 36 and 38 of the branch conduits 18 and 20 form a substantially annular outwardly facing surface with the exception of longitudinally extending gaps 40 established at the transition between the curved walls 36 and 38 and the side walls 26 and 28, respectively. If desired, a saddle and U-bolt assembly 41 may be secured about the branch conduits 18 and 20, as shown in FIGURE 1, to maintain the end portions in proper alignment.

The main conduit 22 has a rearwardly extending portion 42, connected to a conventional muffler (not shown) and exhausting rearwardly of the vehicle, and an enlarged forward end portion 44 integrally connected to the rearwardly extending portion 42 by a conical transition portion 46. The radially inwardly facing surface 48 of the end portion 44 is adapted to telescopically receive and circumferentially engage the outwardly facing surfaces of curved walls 36 and 38. A slight interference fit between the branch conduit assembly and the main conduit is desirable. However, satisfactory joints have been obtained when the relative sizes have ranged between a .003 inch clearance to a .010 inch interference. As shown in FIGURES 2 and 3, the end faces 50 and 52 of the branch conduits 18 and 20, respectively, are transversely aligned and rearwardly located within the main conduit 22 by engagement with the conical portion 46.

Referring to FIGURES 3 and 5, a pair of circumferentially extending and diametrically opposed slots 54, formed at the juncture of end portion 44 and conical portion 46, have a major axis traversely aligned with end faces 50 and 52 and a minor axis longitudinally aligned with the intersection of side walls 26 and 28 and the gaps 40. When the main conduit 22 has been correctly positioned with respect to the branch conduits 18 and 20, a weld material is applied by a suitable process such as arc welding within the slot to form welds 56 that integrally connect the side walls 26 and 28, the curved walls 36 and 38, and the juncture wall 30 to the main conduit 22. As shown in FIGURES 2 and 4, the welds 56 also fill the gaps 40 to provide a continuous gas-tight seal for the conduit system 14. It should be pointed out that it is desirable that the size of the slots be minimized to reduce the amount of weld material required per connection and reduce the amount of heating so as to eliminate metallurgical changes in the welding zone and warpage of the completed assembly. It has been determined that ⁹⁄₁₆ inch by ¾ inch slots will provide a rigid connection as well as a gas-tight seal for a main conduit having a 2½ inch inner diameter. Additional slots may also be used if increased structural strength is desired. In certain instances, the weld material might flow downwardly through the slots 54 and accumulate at the exhaust outlets 32 and 34. To prevent this possibility, while maintaining an integral rigid connection and gas-tight seal between the main conduit 22 and the branch conduits 18 and 20, the slots 54 may be moved slightly forwardly to a location adjacent to and overlaying the end faces 50 and 52. While this axial shift of the slots 54 is permissible, the minor axis of the slots 54 must still be aligned with the intersection of the side walls 26 and 28 if the proper gas-tight seal is to be maintained.

Since other changes and modifications will be apparent to one skilled in the art, the scope of the invention, is intended to cover such alterations of the illustrative embodiment.

What is claimed is:

1. A connection for joining a pair of exhaust manifold conduits each formed from a single length of pipe to a main conduit in an internal combustion engine exhaust system, comprising: an end portion on the main conduit enlarged with respect to the remainder of the latter and being joined thereto by a conical transition wall, said end portion of said main conduit having an inwardly facing annular surface; a pair of circumferentially extending diametrically opposed slots formed in said end portion at said transition wall, said slots having a circumferentially extending major axis and a longitudinally extending minor axis; generally D-shaped end portions on each of said exhaust manifold conduits defined by a semicircular curved wall and a straight wall, said straight walls being commonly joined by a continuous reversely bent juncture wall and arranged in back-to-back relationship such that said curved walls define an annular outwardly facing surface having longitudinally extending gaps at the transition between said curved walls and said straight walls, said inwardly facing surface of said main conduit telescopically receiving and circumferentially engaging said outwardly facing surface of said end portions of said exhaust manifold conduits, said outwardly facing surface being positioned by engagement of said juncture wall with said conical transition wall such that said straight walls and said longitudinally extending gaps are longitudinally aligned with said minor axis, the edge portion of said end portions of said exhaust manifold conduits being located adjacent said slots and parallel to said major axis and a weld within each of said slots structurally connecting the region of said main conduit adjacent said slot to portions of said curved wall, said straight walls and said juncture wall, said weld additionally sealing said longitudinal gaps to provide a gas-tight seal for said exhaust system.

2. A connection for a conduit system having a main conduit and a pair of branch conduits, comprising; end portions on each of said branch conduits having a curved wall and a straight wall, said branch conduits being arranged with said straight walls in back-to-back relationship with said curved walls defining an outwardly facing surface having longitudinally extending gaps at the transition between said curved walls and said straight walls; an enlarged end portion on said main conduit joined to the latter by a radially outwardly expanding transition wall, said end portion having an inwardly facing surface telescopically receiving and circumferentially engaging said outwardly facing surface of said branch conduits with the end portions thereof being longitudinally positioned by engagement with said transition wall; a pair of diametrically opposed circumferentially extending slots formed in said end portion of said main conduit adjacent said transition wall having a circumferentially extending major axis transverse to said gaps and a minor axis longitudinally aligned with said gaps and said straight walls; a weld within each of said slots integrally connecting the region of said end portion of said main conduit adjacent said slot to portions of said curved walls and said straight walls thereby providing structural strength for said connection and sealing said gaps to provide a gas-tight seal between said main conduit and said branch conduits.

References Cited

UNITED STATES PATENTS

| | | | |
|---|---|---|---|
| 1,934,022 | 11/1933 | Wiggins | 285—287 |
| 3,336,056 | 8/1967 | Cassel et al. | 285—137 |

FOREIGN PATENTS

| | | |
|---|---|---|
| 148,457 | 9/1952 | Australia. |
| 28,497 | 1911 | Great Britain. |

CARL W. TOMLIN, Primary Examiner

W. L. SHEDD, Assistant Examiner

U.S. Cl. X.R.

285—9, 137, 155, 286